United States Patent
O'Hara et al.

(10) Patent No.: US 7,554,098 B2
(45) Date of Patent: Jun. 30, 2009

(54) MEDICAL ISOTOPE GENERATOR SYSTEMS

(75) Inventors: Matthew J. O'Hara, Richland, WA (US); Brian M. Rapko, Pasco, WA (US); Matthew K. Edwards, Kennewick, WA (US); Dennis W. Wester, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 311 days.

(21) Appl. No.: 11/737,885

(22) Filed: Apr. 20, 2007

(65) Prior Publication Data
US 2008/0258076 A1 Oct. 23, 2008

(51) Int. Cl.
*C22B 59/00* (2006.01)
*B01D 15/18* (2006.01)

(52) U.S. Cl. .................. 250/432 PD; 423/2; 423/3; 423/21.1; 423/155; 210/682; 424/1.11

(58) Field of Classification Search ........... 250/432 PD; 423/2, 3, 21.1, 155; 424/1.11; 210/682
See application file for complete search history.

(56) References Cited

U.S. PATENT DOCUMENTS

| | | | |
|---|---|---|---|
| 5,368,736 A | | 11/1994 | Horwitz et al. |
| 5,494,647 A | * | 2/1996 | Huntley ................. 423/2 |
| 6,157,036 A | * | 12/2000 | Whiting et al. ....... 250/432 PD |
| 6,770,195 B2 | * | 8/2004 | Young et al. ............. 210/198.2 |
| 6,908,598 B2 | | 6/2005 | Sylvester |
| 6,972,414 B2 | | 12/2005 | Egorov et al. |
| 7,101,484 B2 | | 9/2006 | Betenekov et al. |
| 2004/0164025 A1 | | 8/2004 | Lewis et al. |
| 2005/0167609 A1 | | 8/2005 | Egorov et al. |

OTHER PUBLICATIONS

Knapp, et al., Anticancer Research, 1997, p. 1783-1796, vol. 17.
Knapp, Cancer Biotherapy and Radiopharmaceuticals, 1998, p. 337-349, vol. 13.
Kit Carlson, Atomic Balm: Finding Hope in Isotopes, ORNL Review, 1996, vol. 29(3).

* cited by examiner

*Primary Examiner*—Jack I Berman
(74) *Attorney, Agent, or Firm*—Allan C. Tuan

(57) ABSTRACT

Medical isotope generator systems are disclosed according to some aspects. In one aspect, a $^{90}Y$ generator system comprises a generator column, a concentration column, and a flow control system, through which the generator column and the concentration column are in fluid communication. The flow control system provides a plurality of flow configurations for delivering a milking solution to the generator column, the concentration column, or both, and for delivering an eluent solution to the concentration column in either a forward or a reverse flow direction. The generator column can comprise a $^{90}Sr$ stock adsorbed on a sorbent. The milking solution preferentially elutes $^{90}Y$ from the generator column. The concentration column comprises a sorbent that captures $^{90}Y$ from the milking solution without altering the milking solution. The eluent solution elutes $^{90}Y$ from the concentration column.

38 Claims, 4 Drawing Sheets

MEDICAL ISOTOPE GENERATOR SYSTEMS

STATEMENT REGARDING FEDERALLY SPONSORED RESEARCH OR DEVELOPMENT

This invention was made with Government support under Grant number 5 R44 RR15167-03 awarded by the National Institute of Health. The Government has certain rights in the invention.

BACKGROUND

Yttrium-90 ($^{90}$Y) is an isotope with increasing significance in medical applications. For example, it is currently approved by the United States Federal Drug Administration (FDA) for treatment of non-Hodgkin's lymphoma. Furthermore, additional uses of $^{90}$Y for diagnostic and therapeutic purposes are currently being actively researched. Existing sources and generator systems of the medical isotope are commonly remotely located relative to patient care facilities and are often manual in nature, requiring a human operator. Since the half-life of $^{90}$Y is relatively short (approximately 64 hours), the remotely-generated radioisotope must be rushed from the place of generation to the place where it will be administered to the patient, which can be burdensome and/or expensive for the medical facilities and the patients. The remote location has typically been necessary to accommodate the requirements associated with the generation and/or storage of the radioactive materials. Accordingly, a need exists for a generator system that can be deployed to patient care facilities for regional, local, or on-site and on-demand production of adequately pure $^{90}$Y.

DESCRIPTION OF DRAWINGS

Embodiments of the invention are described below with reference to the following accompanying drawings.

DESCRIPTION

Figure 1A:
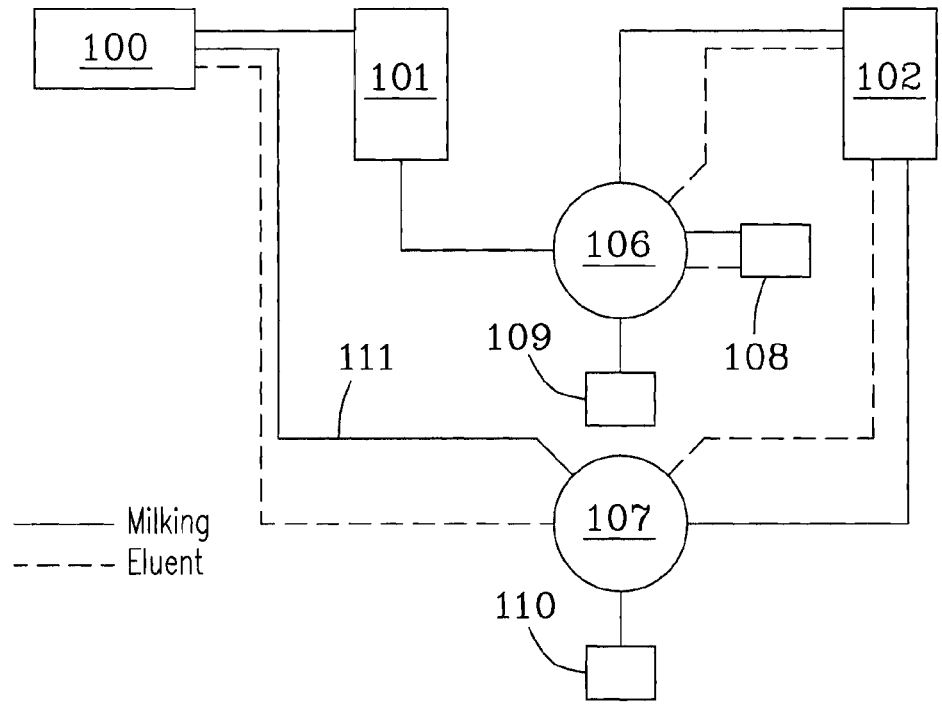
FIGS. 1a and 1b are illustrations showing different configurations of a medical isotope generator system encompassed by embodiments described herein.

At least some aspects of the disclosure provide a medical isotope generator system to generate $^{90}$Y. For example, in one embodiment, the system comprises a generator column, a concentration column, and a flow control system through which the generator and concentration columns are in fluid communication. The generator column can comprise a sorbent on which $^{90}$Sr stock has been adsorbed. The $^{90}$Sr stock would be allowed time to produce $^{90}$Y in the generator column, after which time, the flow control system can deliver a milking solution to preferentially elute the $^{90}$Y from the generator column and deliver the $^{90}$Y-containing milking solution to the concentration column. A sorbent in the concentration column removes $^{90}$Y from the milking solution by adsorption. The flow control system can further deliver an eluent solution to the concentration column in a forward or reverse flow direction to elute the $^{90}$Y from the concentration column.

In some embodiments, the flow control system comprises a multi-port valve and a pump, wherein at least the generator column, the concentration column, and the pump are in fluid communication through the multi-port valve. The system can further comprise a controller that is operably connected to automatically regulate the operation of the pump, the multi-port valve, or both. The automation provided by the controller can enable deployment to point-of-care facilities by simplifying operation of the system. For example, an automated $^{90}$Y generator system can provide push button generation and dispensing of $^{90}$Y. The capability for remote and autonomous production of $^{90}$Y can minimize unnecessary radiological dose to healthcare professionals. In the instant example, the system can further comprise shielding to protect operators and/or patients from radiation exposure. Shielding, in addition to physical separation, can further protect system operational components that are susceptible to radiation damage. An example of such components includes, but is not limited to, the electronics associated with the controller and the flow control system. Accordingly, some embodiments comprise an enclosure providing radiation shielding over at least the generator column, the concentration column, and a $^{90}$Y product vessel for $^{90}$Y-containing eluent. The enclosure can have an access port for retrieving the $^{90}$Y-containing eluent.

The generator column sorbent, the concentration column sorbent, or both can comprise a matrix impregnated with an extractant selected from the group consisting of phosphonic acid extractants, phosphoric acid extractants, sulfonic acid extractants, and combinations thereof. The matrix can comprise an inorganic matrix, a polymeric matrix, or a combination of inorganic and polymeric matrices and it can be grafted, or chemically bonded, onto a support. In some embodiments, the generator column sorbent, the concentration column sorbent, or both can comprise a complexant bonded or grafted to a support. Exemplary supports can include, but are not limited to, polymeric supports, silica supports, inorganic particulate supports, and combinations thereof.

In some embodiments, the generator column sorbent, the concentration column sorbent, or both can comprise a resin. Exemplary resins can include, but are not limited to, chelating resins, cation-exchange resins, or a combination thereof. Chelating resins can refer to, but are not limited to, materials having a diphosphonic acid, organophosphoric acid, or other grafted chelating functionality. Cation-exchange resins can refer to, but are not limited to, materials having a grafted sulfonic acid functionality and materials having a grafted carboxylic acid functionality.

In other embodiments, the generator column and/or concentration column sorbents can have molecular-recognition functionality. Exemplary sorbents having molecular-recognition functionality can include, but are not limited to, materials incorporating cyclic polyethers, materials incorporating cyclic polyethers and cyclic azapolyethers, materials incorporating cyclic azaethers. Furthermore, the sorbents can comprise materials incorporating grafted ionizable carboxylic, sulfonic, phosphonic, or phosphoric acid, and combinations thereof.

In still other embodiments, the sorbents can comprise a porous organic or inorganic molecular sieve material.

In some embodiments, the generator column is pre-loaded with $^{90}$Sr and is a fixed $^{90}$Y source. In such instances, the generator column sorbent should be radiolytically stable for the lifetime of the fixed source. Radiolytic stability, as used herein, can refer to a sorbent's ability to not change its sorption characteristics, with respect to Y and Sr, in a way that substantially impacts the separation factors to compromise the satisfactory production of purified $^{90}$Y. Furthermore, radiolytic stability can mean that the sorbent does not result in the introduction of additional or enhanced concentrations of a material so as to compromise the usefulness of the purified $^{90}$Y as defined by the product specifications. In one embodiment, the radioytically stable period is at least approximately six months. Inorganic materials and graphite-based materials can be highly resistant to radiolysis. One example includes, but is not limited to, antimony silicate based columns. Tests of the radiolytic stability of an antimony silicate based column have been performed by comparing the uptake properties of radiostrontium before and after a 1-year dose equivalent exposure of gamma radiation. The uptake properties were substantially unchanged.

The fixed source can be implemented as a cartridge-style device that can easily be exchanged with a replacement cartridge at the end of the fixed source's lifetime. The $^{90}$Sr stock loaded in the generator column can be distributed throughout the generator column in order to prevent localized hot spots in which the concentration of radioactive material is particularly high. Such hot spots can result in localized radiation-induced degradation and/or damage to the generator column. Accordingly, distribution of the $^{90}$Sr stock throughout the generator column can contribute to maximization of the lifetime of the generator column as a fixed $^{90}$Y source.

An exemplary method for making a generator column preloaded with $^{90}$Sr stock, which is distributed throughout the column can include, but is not limited to, batch contact of a bulk of sorbent in a solution containing $^{90}$Sr, followed by wet slurry packing of the sorbent into the generator column. In one embodiment, a bed of non-Sr containing sorbent (i.e., pristine sorbent) can be packed into the generator column prior to wet slurry packing the Sr-containing sorbent. In this manner, $^{90}$Sr must migrate through the portion of the column containing the pristine sorbent, which can increase the useable lifespan of the generator column.

Examples of milking solutions can include, but are not limited to aqueous solutions of a mineral acid. Specific mineral acids can include, but are not limited to, hydrochloric acid, sulfuric acid, and phosphoric acid. In one embodiment, wherein the sorbent comprises antimony silicate, the milking solution comprises an aqueous solution having a concentration of HCl ranging from approximately 0.01 to approximately 4 moles per liter. In another embodiment, the concentration of HCl ranges from approximately 0.9 to approximately 1.1 moles per liter. The $^{90}$Y eluted from the generator column can then be removed at the concentration column without modifying the milking solution. Additional concentrations and sorbents are appropriate and are encompassed by other embodiments of the present invention.

Examples of the eluent solution can include, but are not limited to, aqueous solutions of a mineral acid. In one embodiment, wherein the concentration column sorbent comprises a cation exchange resin, the eluent solution comprises an aqueous solution having a concentration of HCl greater than or equal to approximately 1 mole per liter. In another embodiment, the concentration of HCl ranges from approximately 3 to approximately 12 moles per liter. Additional concentrations are appropriate and are encompassed by other embodiments of the present invention.

The eluent solution, and/or the milking solution, can be compatible with chelation of $^{90}$Y. The chelation-compatible eluent solution can be either directly compatible with or easily modified to enable uptake of yttrium into a drug or antibody which can be injected into a patient. Exemplary modification can include the addition of buffering salts to the $^{90}$Y-containing eluent solution prior to complexing with a chelating agent.

In some embodiments, the eluent solution can further comprise a salt of the mineral acid. Examples of salts can include, but are not limited to, lithium chloride, sodium chloride, potassium chloride, lithium sulfate, sodium sulfate, potassium sulfate, and combinations thereof. In general terms, the salts can comprise salts of monovalent, divalent and trivalent cations.

In an exemplary embodiment, the eluent solution comprises an aqueous solution of hydrochloric acid having a concentration ranging from approximately 0.01 to approximately 1 moles per liter and potassium chloride having a concentration greater than or equal to approximately 1 mole per liter. In another embodiment, the KCL concentration can range from approximately 1 to approximately 2.5 moles per liter. Alternatively, the potassium chloride can be substituted with sodium chloride having a concentration greater than or equal to approximately 1 mole per liter. In still another embodiment, the NaCl concentration can range from approximately 2 to approximately 2.5 moles per liter. In some instances, it is advantageous to minimize the acid concentration. Accordingly, in some embodiments, the eluent solution can comprise hydrochloric acid in concentrations ranging from approximately 0.05 to approximately 0.5 moles per liter.

Embodiments of the medical isotope generator system described herein can be configured in various ways and can comprise a generator column, a concentration column, and a flow control system having a pump and multi-port valves. Referring to the embodiment illustrated in FIG. 1a, one particular configuration comprises a flow control system having a pump 100, a first multi-port valve 106, and a second multi-port valve 107. Milking solution can be delivered from the pump 100 to the generator column 101 to remove $^{90}$Y, which had been produced from the $^{90}$Sr loaded in the generator column. The $^{90}$Y-containing milking solution can then be delivered to the concentration column 102 through the first valve 106. Fluid line 111 is optional and can be included for automatic conditioning of the concentration column 102, via the second valve 107, with milking solution or a conditioning solution, which is then directed through the first valve 106 to waste 108 or recycle.

The concentration column 102 adsorbs $^{90}$Y and removes it from the milking solution. The milking solution from the concentration column can then be directed through the second valve 107 to waste 110 or recycle. The eluent solution can then be delivered to the concentration column 102 through the second valve 107 in a reverse direction. The eluent solution removes $^{90}$Y from the concentration column, and the $^{90}$Y-containing eluent is then directed to a $^{90}$Y product delivery vessel 109 through the first valve 106.

Figure 1B:
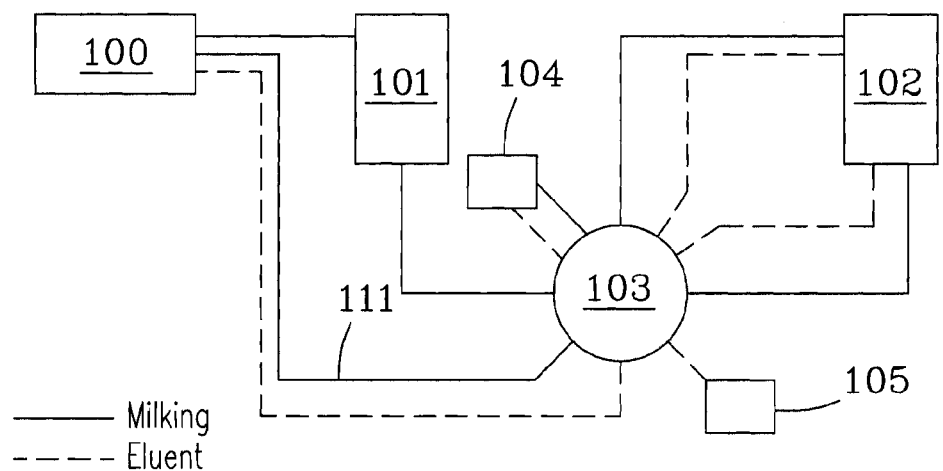

Referring to the embodiment illustrated in FIG. 1b, an alternative and preferred configuration utilizes a single multi-port valve 103. The instant embodiment utilizes the minimum number of process components, which is advantageous in terms of simple operation and maintenance. For example, minimalist configurations reduce the number of components that need to be controlled, sterilized, repaired, or replaced. The pump 100 and the single multi-port valve 103 allows milking solution to be delivered from the generator column 101, where the milking solution removes $^{90}$Y that had been produced from the $^{90}$Sr parent stock, to the concentration column 102. Furthermore, the multi-port valve 103 can be positioned to deliver a $^{90}$Y-less milking solution from the pump 100 to the concentration column through line 111 for conditioning purposes. Such milking solution can then go to waste 104 or it can be recycled. Once the $^{90}$Y is adsorbed on the concentration column 102, eluent solution can be delivered in a forward or reverse direction through the concentration column 102 according to the appropriate configuration of valve 103. Accordingly, $^{90}$Y-containing eluent is delivered to a $^{90}$Y product delivery vessel 105.

Specific embodiments of the isotope generator system can utilize, for example, pumps comprising syringe pumps, peristaltic pumps, fluid metering pumps, and other mechanical devices for moving fluid. The pumps can have an integrated multi-position distribution valve for delivery of reagents along various flow paths. For example, in embodiments utilizing a syringe pump, an integrated distribution valve is common and can be used to select between drawing an amount of a particular reagent (e.g., milking solution, eluent solution, etc.) into the pump and delivering the reagent to the column(s).

In one embodiment, the medical isotope generator system utilizes pneumatics to drive fluid flow. A pneumatic pump can be substantially physically separated from the generator and concentration columns. Accordingly, the hardware and electronics associated with the pump can be isolated from potential radiation damage from exposure.

The medical isotope generator system can further comprise at least one catch column to further remove $^{90}$Sr from $^{90}$Y-containing milking solution, eluent solution, or both. Exemplary catch columns can comprise the same sorbent used in the generator column. The catch column can be in fluid communication with the generator column, the concentration column, or both through the flow control system. For example, in one embodiment a catch column exists between the generator column and the concentration column and enhances the purity of the $^{90}$Y-containing milking solution on a flow path from the generator column to the concentration column.

In one embodiment, the medical isotope generator system comprises a plurality of generator columns. The flow control system can deliver milking solution to one or more of the generator columns sequentially and/or substantially simultaneously. In one configuration, the plurality of generator columns can be used to increase throughput of the medical isotope generator system, without increasing the amount of radioactive material in each generator column. The generator columns can be mounted on a carousel and interchanged during operation. Alternatively, the generator columns can be fluidically interconnected via a selection valve. For example, milking solution can be delivered to a first generator column for milking of $^{90}$Y while a second generator column is allowed time to generate $^{90}$Y from the $^{90}$Sr stock. After milking the first generator column, the second generator column can be made available for milking. Alternatively, multiple columns can be milked in a single instance to increase the amount of $^{90}$Y in a single extraction.

Similarly, the medical isotope generator can comprise a plurality of concentration columns. The flow control system can provide flow configurations for delivering the milking solution to one or more of the concentration columns or for delivering the eluent solution in a forward or reverse flow direction to each of one or more of the concentration columns. Delivery of solutions to the concentration columns can be sequential and/or substantially simultaneous.

In some embodiments, the flow control system can further provide flow configurations for delivering a storage fluid, a sterilization fluid, or both throughout the fluid lines and columns of the medical isotope generator system. The storage fluid can comprise a chemically inert fluid that can be delivered to the components of the generator system to reduce the effects of radiation on the column materials and to maintain a sterile environment in the column during idle periods. Exemplary storage fluids can include, but are not limited to, chemically benign fluids such as ethyleneoxide, inert gases, water, and dilute mineral acids. The sterilization fluid can be used to establish and maintain the sterility of the columns, valves, and the fluid lines.

The milking solution, eluent solution, storage fluid, and/or sterilization fluid can be stored in one or more reagent reservoirs. The reagent reservoirs can be in fluid communication with the generator and/or concentration columns through the flow control system. Accordingly, in one embodiment, the reagent reservoirs are in fluid communication with a pump. The pump can selectively draw and deliver the solutions and fluids to the appropriate component of the medical isotope generator system through one or more multi-port valves and/or through an integrated distribution valve.

Figure 2A:
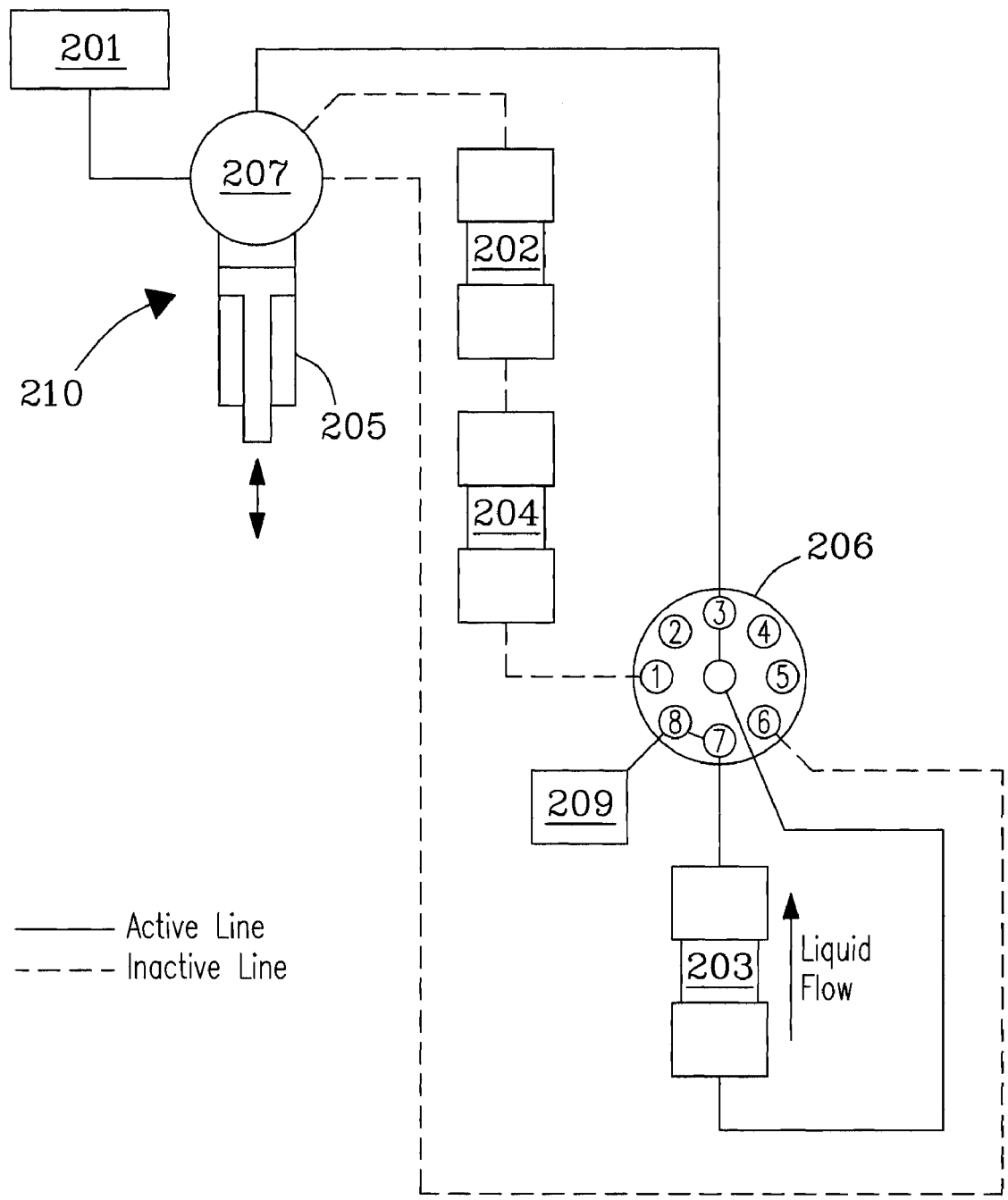
FIGS. 2a through 2c are illustrations showing valve positions during operation of an embodiment of a medical isotope generator system described herein.
Figure 2B:
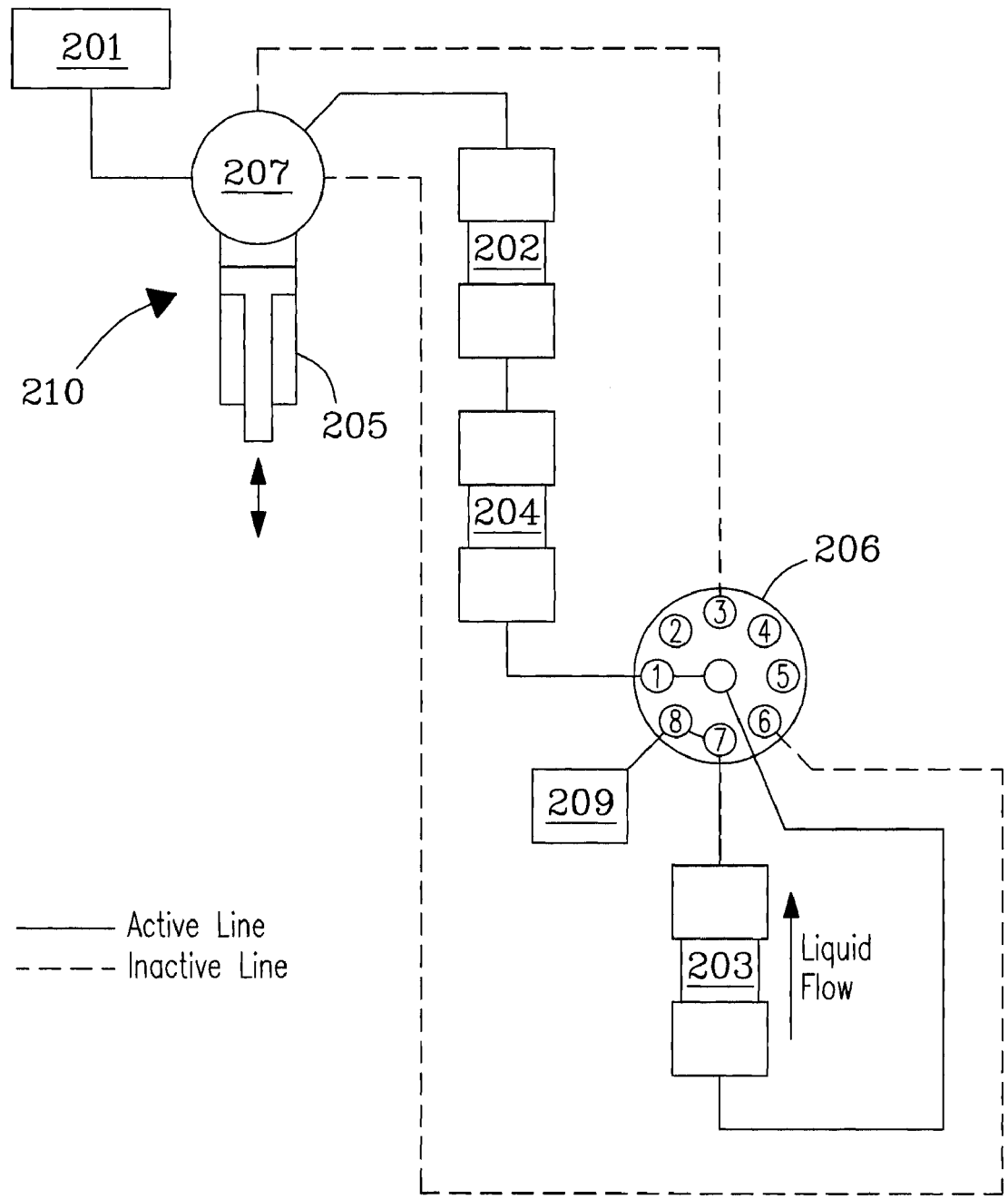
Figure 2C:
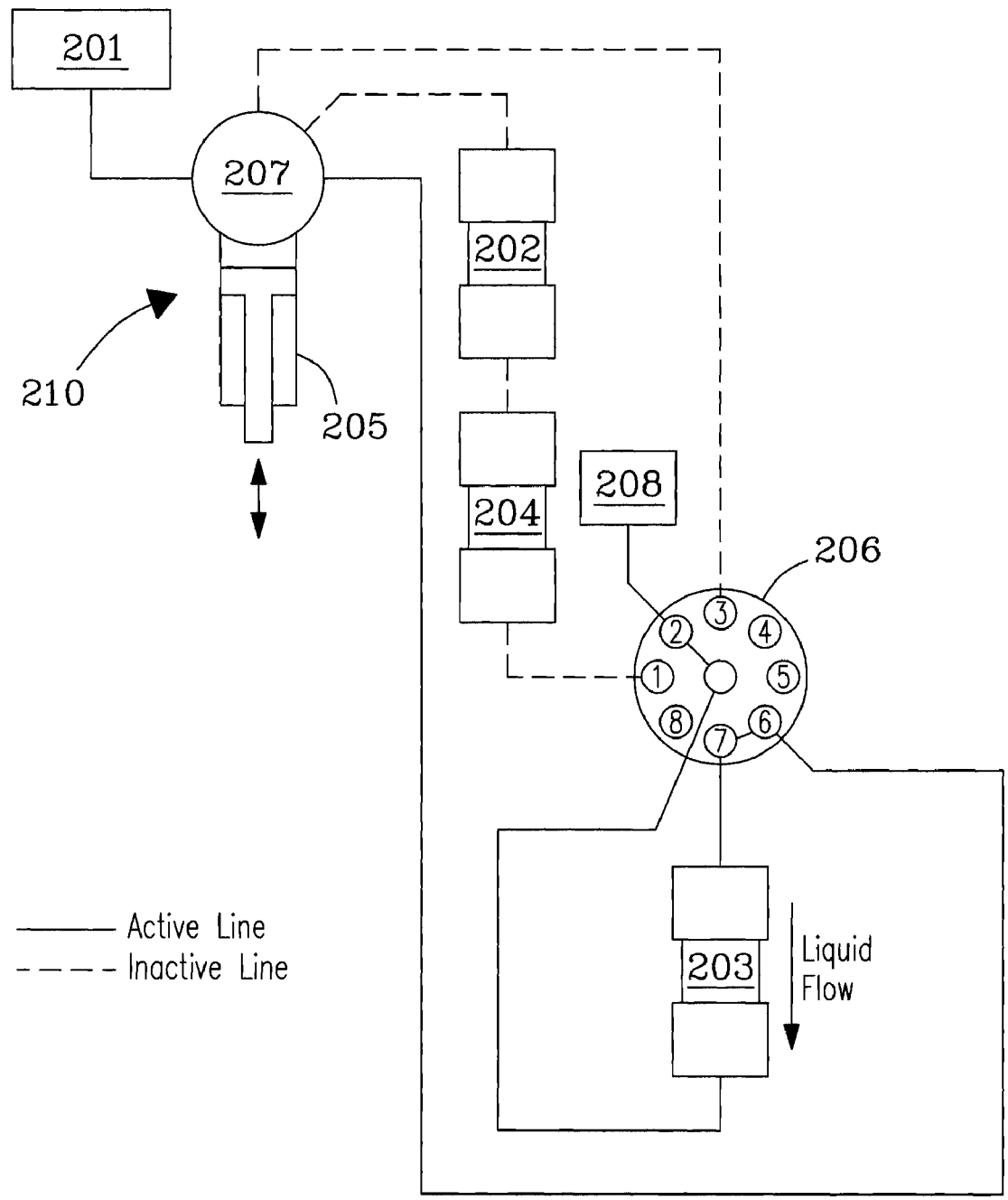

Referring to FIGS. 2a through 2c, three flow configurations of an exemplary embodiment of medical isotope generator system are illustrated. The system comprises a generator column 202, a catch column 204, a concentration column 203, and a fluid control system comprising the flow-through version of a nine-port stream selector valve 206, a distribution pump 210 comprising a syringe pump 205 having an integrated six-port distribution valve 207, and fluid lines interconnecting the components of the system. The fluid control system is operably connected to processing circuitry for automated control according to control algorithms that can be implemented by the processing circuitry. The position of the valves is changed using an actuator that is operably connected to the processing circuitry.

Referring to the illustration in FIG. 2a, the integrated distribution valve 207 is positioned to allow milking solution to be drawn into the syringe pump from one or more reagent sources 201. The integrated distribution valve 207 then changes position to deliver the milking solution through the stream selector valve 206, which is configured to allow the milking solution to flow through port 3 of the stream selector valve 206 to the concentration column 203. For purposes of conditioning the concentration column sorbent material, the milking solution passes through the concentration column and is routed to waste 209, or to recycle, through the stream selector valve 206. The remaining fluid lines are closed off by either, or both, the integrated distribution valve 207 or the stream selector valve 206.

Referring to the illustration in FIG. 2b, the integrated distribution valve 207 is positioned so the syringe pump can deliver milking solution to the generator column 202. The milking solution removes $^{90}$Y, which had been generated from the parent $^{90}$Sr isotope, from the sorbent in the generator column 202. The $^{90}$Y-containing milking solution then flows through the catch column 204 to further remove any $^{90}$Sr contamination. The $^{90}$Y-containing milking solution is then delivered to the concentration column 203 through port 1 of the stream selector valve 206. The $^{90}$Y isotope adsorbs to the sorbent material in the concentration column 203 and the $^{90}$Y-free milking solution is directed to waste 209, or to recycle.

Referring to the illustration in FIG. 2c, the position of the integrated distribution valve 207 changes to allow eluent solution to be drawn into the syringe pump. The integrated distribution valve 207 then changes position to deliver the eluent solution to the stream selector valve 206, which is configured to allow the eluent solution to flow through port 6 to the concentration column. In the instant embodiment, the eluent solution flows through the concentration column in a reverse direction relative to the flow direction used when loading the concentration column 203 with $^{90}$Y. The $^{90}$Y-containing eluent solution is then delivered to a product vial 208 through port 2 of the stream selector valve 206.

Referring to the embodiment illustrated in FIGS. 2a through 2c, the generator column 202 can comprise antimony silicate as a sorbent. Preferably, the antimony silicate is of a form that is compatible with a packed column. Exemplary forms can include pellets, coated beads, porous monoliths, etc. The bed volume can be approximately 5.1 cm³. The catch column 204 can comprise the same antimony silicate as the generator column, and can have a volume of approximately 0.39 cm³. The concentration column 203 can comprise a cation exchange resin (BioRad AG 50-X8). The dimensions of the concentration column 203 can range from approximately 50 to approximately 75 mm long and be approximately 4.6 mm in diameter. While column dimensions have been specified for purposes of illustration, one of ordinary skill in the art would recognize that the dimensions described herein are not limiting and that other sizes and/or shapes can be appropriate depending on the application.

The milking solution can comprise HCl at concentrations ranging from approximately 0.5 M to approximately 1 M. The eluent solution can comprise HCl at concentrations ranging from approximately 3 M to approximately 6 M, or higher. Alternatively, the eluent solution comprises HCl at concentrations ranging from approximately 0.01 M to approximately 0.5 M and comprises KCl or NaCl in concentrations between approximately 1 M and approximately 2.5 M or higher. Generator systems configured as described in the instant embodiment can achieve, at the time of separation, an activity-based $^{90}$Sr/$^{90}$Y separation factor that is less than or equal to approximately $2 \times 10^{-5}$.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A medical isotope generator system comprising:
   a generator column comprising $^{90}$Sr stock adsorbed on a sorbent, wherein at least a portion of the $^{90}$Sr stock is allowed time to decay to a $^{90}$Y daughter isotope;
   a milking solution to preferentially remove $^{90}$Y from the generator column;
   a concentration column comprising a sorbent to capture $^{90}$Y from the milking solution without alteration to the milking solution;
   an eluent solution to remove $^{90}$Y from the concentration column; and
   a flow control system, through which the generator column and the concentration column are in fluid communication, providing a plurality of flow configurations for delivering the milking solution to the generator column, the concentration column, or both, and for delivering the eluent solution to the concentration column in either a forward or a reverse flow direction.

2. The medical isotope generator system as recited in claim 1, wherein the flow control system is an automated flow control system comprising a pump and a multi-port valve, wherein the pump and the multi-port valve are in fluid communication.

3. The medical isotope generator system as recited in claim 2, further comprising a controller operably connected to automatically regulate the operation of the pump, the multi-port valve, or both.

4. The medical isotope generator system as recited in claim 1, wherein operational components susceptible to radiation damage are shielded from radiation exposure, physically distanced from radiation exposure, or both.

5. The medical isotope generator system as recited in claim 4, wherein the automated flow control system utilizes pneumatics to drive fluid flow.

6. The medical isotope generator system as recited in claim 1, wherein the $^{90}$Sr stock is distributed throughout the generator column.

7. The medical isotope generator system as recited in claim 1, wherein the generator column sorbent is radiolytically stable over a period of at least approximately 6 months.

8. The medical isotope generator system as recited in claim 1, wherein the $^{90}$Sr stock adsorbed on the generator column sorbent is a fixed source.

9. The medical isotope generator system as recited in claim 1, further comprising at least one catch column to substantially remove $^{90}$Sr from $^{90}$Y-containing eluent solution, milking solution, or both, wherein the catch column is in fluid communication with the generator column, the concentration column, or both through the flow control system.

10. The medical isotope generator system as recited in claim 1, wherein the activity-based $^{90}$Sr/$^{90}$Y separation factor is less than or equal to $2.0 \times 10^{-5}$ at the time of separation.

11. The medical isotope generator system as recited in claim 1, further comprising at least one additional generator column, wherein the automated flow control system provides flow configurations for delivering the milking solution to one or more of the generator columns at a time.

12. The medical isotope generator system as recited in claim 1, further comprising at least one additional concentration column, wherein the automated flow control system provides flow configurations for delivering the milking solution to one or more of the concentration columns at a time or for delivering the eluent solution, in a forward or reverse flow direction, to each of one or more of the concentration columns at a time.

13. The medical isotope generator system as recited in claim 1, wherein the flow control system further provides flow configurations for delivering a storage solution, a sterilization solution, or combinations thereof throughout valves, fluid lines and columns of the medical isotope generator system.

14. The medical isotope generator system as recited in claim 1, further comprising one or more reagent reservoirs in fluid communication with the automated flow control system, wherein the reagent reservoirs contain milking solution, eluent solution, storage solution, sterilization solution, or conditioning solution.

15. The medical isotope generator system as recited in claim 1, wherein the generator column sorbent, the concentration column sorbent, or both, comprises an inorganic matrix impregnated with an extractant selected from the group consisting of phosphonic acid extractants, phosphoric acid extractants, sulfonic acid extractants, and combinations thereof.

16. The medical isotope generator system as recited in claim 1, wherein the generator column sorbent, the concentration column sorbent, or both, comprises a polymeric matrix impregnated with an extractant selected from the group consisting of phosphonic acid extractants, phosphoric acid extractants, sulfonic acid extractants, and combinations thereof.

17. The medical isotope generator system as recited in claim 1, wherein the generator column sorbent, the concentration column sorbent, or both, comprises a combination of inorganic and polymeric matrices impregnated with an extractant selected from the group consisting of phosphonic acid extractants, phosphoric acid extractants, sulfonic acid extractants, and combinations thereof.

18. The medical isotope generator system as recited in claim 1, wherein the generator column sorbent, the concentration column sorbent, or both, comprises a matrix that is polymeric material, an inorganic material, or a combination thereof, and wherein the matrix is grafted onto a support.

19. The medical isotope generator system as recited in claim 18, wherein the support is selected from the group consisting of polymeric supports, silica supports, inorganic particulate supports, and combinations thereof.

20. The medical isotope generator system as recited in claim 1, wherein the generator column sorbent, the concentration column sorbent, or both, comprises a complexant bonded or grafted to a support selected from the group consisting of polymeric supports, silica supports, inorganic particulate supports, and combinations thereof.

21. The medical isotope generator system as recited in claim 1, wherein the generator column sorbent, the concentration column sorbent, or both, comprises a chelating resin, a cation-exchange resin, or a combination thereof.

22. The medical isotope generator system as recited in claim 1, wherein the generator column sorbent, the concentration column sorbent, or both, comprises a material having molecular-recognition functionality.

23. The medical isotope generator system as recited in claim 1, wherein the generator column sorbent, the concentration column sorbent, or both, comprises a porous organic or inorganic molecular sieve material.

24. The medical isotope generator system as recited in claim 1, wherein the milking solution comprises an aqueous solution of a mineral acid having a concentration ranging from approximately 0.01 to approximately 4 moles/liter.

25. The medical isotope generator system as recited in claim 24, wherein the aqueous solution has a mineral acid concentration in the range of approximately 0.9 to approximately 1.1 moles/liter.

26. The medical isotope generator system as recited in claim 1, wherein the eluent solution comprises an aqueous solution of a mineral acid having a concentration greater than approximately 1 mole per liter.

27. The medical isotope generator system as recited in claim 26, wherein the aqueous solution has a mineral acid concentration in the range of approximately 3 to approximately 12 moles/liter.

28. The medical isotope generator system as recited in claim 26, wherein the aqueous solution further comprises a salt of the mineral acid.

29. The medical isotope generator system as recited in claim 28, wherein the salt is selected from the group consisting of lithium chloride, sodium chloride, potassium chloride, lithium sulfate, sodium sulfate, potassium sulfate.

30. The medical isotope generator system as recited in claim 1, wherein the eluent solution comprises an aqueous solution of
a) hydrochloric acid having a concentration ranging from approximately 0.01 to approximately 1 moles/liter; and
b) potassium chloride having a concentration ranging from approximately 1 to approximately 2.5 moles/liter or sodium chloride having a concentration ranging from approximately 2 to approximately 2.5 moles/liter.

31. The medical isotope generator system as recited in claim 30, wherein the concentration of the hydrochloric acid ranges from approximately 0.05 to approximately 0.5 moles/liter.

32. The medical isotope generator system as recited in claim 1, wherein the milking solution, the eluent solution, or both are compatible with chelation of $^{90}Y$.

33. The medical isotope generator system as recited in claim 1, wherein a storage solution comprising a chemically benign solution is delivered to the generator column and the concentration column for long-term storage of the system.

34. The medical isotope generator system as recited in claim 33, wherein the chemically benign solution is selected from the group consisting of water and dilute mineral acid.

35. The medical isotope generator system as recited in claim 1, wherein a sterilization fluid comprising a sterilizing agent is delivered throughout the medical isotope generator system by the fluid control system.

36. A medical isotope generator system comprising:
a generator column comprising $^{90}Sr$ stock adsorbed on a sorbent, wherein at least a portion of the $^{90}Sr$ stock is allowed time to decay to $^{90}Y$ daughter isotopes;
a milking solution to preferentially remove $^{90}Y$ from the generator column;
a concentration column comprising a sorbent to capture $^{90}Y$ from the milking solution without alteration to the milking solution;
an eluent solution to remove $^{90}Y$ from the concentration column;
an automated flow control system, through which the generator column and the concentration column are in fluid communication, providing a plurality of flow configurations for delivering the milking solution to the generator column, the concentration column, or both, and for delivering the eluent solution to the concentration column in either a forward or a reverse flow direction, wherein the automated flow control system comprises a controller to automatically regulate the operation of a single distribution pump and a single stream selector valve in fluid communication; and
an enclosure providing radiation shielding over at least the generator column, the concentration column, and a $^{90}Y$ product vessel for $^{90}Y$-containing eluent, wherein the enclosure has an access port for retrieving the $^{90}Y$-containing eluent.

37. The medical isotope generator system as recited in claim 36, wherein the distribution pump comprises a syringe pump.

38. The medical isotope generator system as recited in claim 36, wherein the automated flow control system utilizes pneumatics to drive fluid flow, and wherein operational components susceptible to radiation damage are not exposed to radiation.

* * * * *